(No Model.)

J. M. DODGE.
PROCESS OF AND APPARATUS FOR CONVEYING MATERIAL.

No. 544,970. Patented Aug. 20, 1895.

Witnesses:
F. D. Goodwin
Will. A. Barr.

Inventor:
James M. Dodge
by his Attorneys
Howson & Howson

UNITED STATES PATENT OFFICE.

JAMES M. DODGE, OF PHILADELPHIA, PENNSYLVANIA, ASSIGNOR TO THE AIR CONVEYOR COMPANY, OF CAMDEN, NEW JERSEY, AND NICETOWN, PENNSYLVANIA.

PROCESS OF AND APPARATUS FOR CONVEYING MATERIAL.

SPECIFICATION forming part of Letters Patent No. 544,970, dated August 20, 1895.

Application filed July 10, 1895. Serial No. 555,672. (No model.)

*To all whom it may concern:*

Be it known that I, JAMES M. DODGE, a citizen of the United States, residing in Philadelphia, Pennsylvania, have invented certain Improvements in Processes of and Apparatus for Conveying Material, of which the following is a specification.

My invention relates to certain details of construction of the apparatus described and claimed in the application filed by me on the 26th day of June, 1895, Serial No. 554,118.

The object of my invention is to reduce the friction of the material being conveyed by mechanical means along the bed or trough. This object I attain by buoying the material by air or other fluid under pressure while it is being conveyed by the said mechanism.

Figure 1:
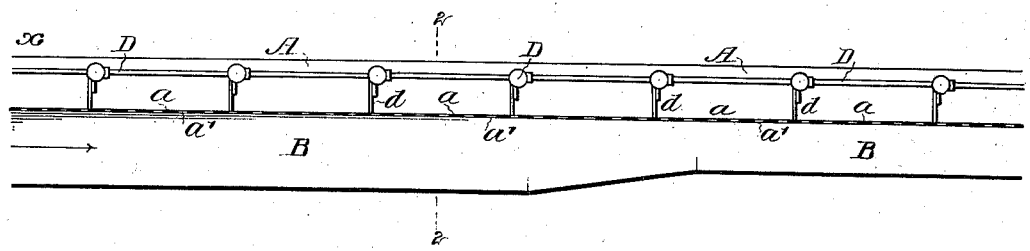
Figure 2:
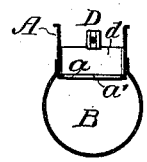
Figure 3:
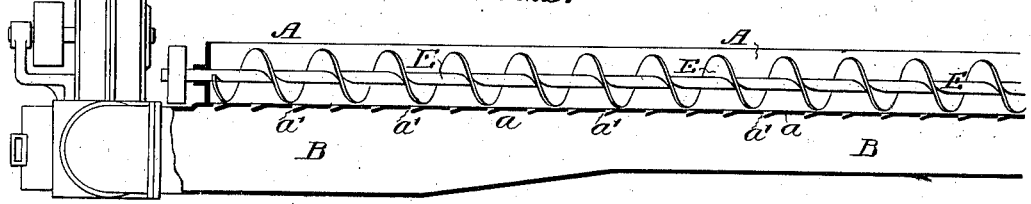

In the accompanying drawings, Figure 1 is a longitudinal sectional view of one form of apparatus illustrating my invention. Fig. 2 is a transverse section on the line 2 2, Fig. 1. Fig. 3 is a longitudinal sectional view showing a screw conveyer embodying my invention.

A is the trough of the usual construction, having a bed or bottom a, in which are a series of openings a', preferably in the form of narrow slots, and situated at such a distance apart that the material conveyed in the trough will be buoyed by the air under pressure. Directly under the trough in the present instance is a conductor B for the air or other fluid, the air being controlled by a suitable valve. I prefer to use an ordinary fan-blower to force the air into the conductor.

D is an endless-chain conveyer having flights d of the form desired. This conveyer is driven in the direction of its arrow, Fig. 1, in the ordinary manner. The conveyer-chain and flights are so set in respect to the trough that the flights will convey the material along the trough from the inlet end x, and the material while being conveyed will be buoyed or lifted off the bottom of the trough by the air under pressure, which escapes through the openings. These openings may be inclined in one direction or the other without departing from my invention. The best results are obtained, however, by forming the openings so that the air will escape in the direction in which the load is being carried.

In Fig. 3 I have shown a screw conveyer E as a substitute for the chain conveyer, (shown in Figs. 1 and 2,) and it will be understood that I do not limit myself to the construction and arrangement of the mechanical conveyer, as any conveyer can be used in combination with the fluid under pressure to gain the result claimed by me.

I claim as my invention—

1. The process herein described of conveying material, said process consisting in feeding the material to the bed, conveying it by mechanical means, supporting it throughout its whole passage along the bed by the lifting or buoying action of air or other fluid escaping from pressure, substantially as described.

2. The combination in a conveyer, of the bed, a conductor for fluid under pressure, said bed having openings in its bottom communicating with the conductor, with a mechanical conveyer for the material, said material being supported throughout its whole passage along the conveyer by the lifting action of the air or other fluid escaping from the conductor through the openings in the bed, substantially as described.

In testimony whereof I have signed my name to this specification in the presence of two subscribing witnesses.

JAMES M. DODGE.

Witnesses:
   WILL. A. BARR,
   JOS. H. KLEIN.